(12) United States Patent
Stella (10) Patent No.: US 8,960,118 B2
(45) Date of Patent: Feb. 24, 2015

(54) LIFTING APPARATUS FOR SUBMARINE-ATMOSPHERIC INTERFACE DEVICES AND SUBMARINE COMPRISING THE LIFTING APPARATUS

(71) Applicant: Calzoni S.r.l., Calderara di Reno (Bologna) (IT)

(72) Inventor: Vittorio Stella, Bologna (IT)

(73) Assignee: Calzoni S.r.l. (IT)

( * ) Notice: Subject to any disclaimer, the term of this patent is extended or adjusted under 35 U.S.C. 154(b) by 93 days.

(21) Appl. No.: 13/830,577

(22) Filed: Mar. 14, 2013

(65) Prior Publication Data
US 2013/0269586 A1 Oct. 17, 2013

(30) Foreign Application Priority Data

Apr. 13, 2012 (IT) ............................... BO2012A0200

(51) Int. Cl.
| | | |
|---|---|---|
| *B63G 8/04* | (2006.01) | |
| *B63G 8/06* | (2006.01) | |
| *B63G 8/00* | (2006.01) | |
| *F16M 13/02* | (2006.01) | |
| *B63G 8/38* | (2006.01) | |

(52) U.S. Cl.
CPC .. *B63G 8/06* (2013.01); *B63G 8/00* (2013.01); *F16M 13/022* (2013.01); *B63G 8/38* (2013.01)
USPC ............................ 114/339; 114/340; 359/402

(58) Field of Classification Search
USPC ................................... 114/339, 340; 359/402
See application file for complete search history.

(56) References Cited

U.S. PATENT DOCUMENTS

| | | | | | |
|---|---|---|---|---|---|
| 2,503,748 | A | * | 4/1950 | Kollmorgen | 359/406 |
| 4,436,051 | A | * | 3/1984 | Nollez et al. | 114/340 |
| 4,447,129 | A | * | 5/1984 | Barthelat et al. | 359/872 |
| 4,771,721 | A | * | 9/1988 | Pratt | 114/340 |
| 4,848,886 | A | * | 7/1989 | Pratt | 359/406 |
| 5,128,688 | A | * | 7/1992 | West | 343/766 |
| 5,634,424 | A | * | 6/1997 | Ortelli | 114/339 |

(Continued)

FOREIGN PATENT DOCUMENTS

| | | |
|---|---|---|
| DE | 102006061294 | 4/2008 |
| DE | 102008033364 | 1/2010 |

(Continued)

OTHER PUBLICATIONS

Italian Search Report dated Dec. 20, 2012 from counterpart application.

*Primary Examiner* — Lars A Olson
*Assistant Examiner* — Jovon Hayes
(74) *Attorney, Agent, or Firm* — Timothy J. Klima; Shuttleworth & Ingersoll, PLC (57) ABSTRACT

A lifting apparatus for devices used for detection, observation, air intake or communication on a submarine comprises a first movable mounting unit and a second movable mounting unit equipped at the top of them with at least one detection or communication device and at least one actuator associated with the first movable mounting unit and/or with the second movable mounting unit to move them along a main direction of movement. The apparatus further comprises a supporting member extending along the main direction and interposed between the first movable mounting unit and the second movable mounting unit and also having a pair of guides, each extending along the main direction and slidably coupled to a respective movable mounting unit to guide its movement along the selfsame main direction.

15 Claims, 5 Drawing Sheets

(56) References Cited

U.S. PATENT DOCUMENTS

| | | | |
|---|---|---|---|
| 6,124,968 A * | 9/2000 | Pieri et al. | 359/405 |
| 6,347,010 B1 * | 2/2002 | Chen et al. | 359/402 |
| 6,715,439 B1 * | 4/2004 | Ortelli | 114/339 |
| 6,907,839 B2 * | 6/2005 | Kruger et al. | 114/339 |
| 7,209,288 B2 * | 4/2007 | Wantig et al. | 359/402 |
| 7,278,347 B1 * | 10/2007 | Scharf et al. | 89/37.06 |
| 7,472,665 B2 * | 1/2009 | Bertin | 114/339 |
| 7,549,386 B2 * | 6/2009 | Bertin | 114/328 |
| 2007/0215030 A1 * | 9/2007 | Scharf et al. | 114/340 |
| 2013/0269586 A1 * | 10/2013 | Stella | 114/339 |

FOREIGN PATENT DOCUMENTS

| | | | | |
|---|---|---|---|---|
| EP | 0065457 | | 11/1982 | |
| EP | 0711702 | | 5/1996 | |
| EP | 1162137 | | 12/2001 | |
| EP | 1177974 | | 2/2002 | |
| EP | 1462360 | | 9/2004 | |
| EP | 1739006 | | 1/2007 | |
| EP | 1739006 A2 * | 1/2007 | |
| EP | 1847454 | | 10/2007 | |
| EP | 1739006 A3 * | 4/2008 | |
| EP | 2706428 | | 7/2009 | |
| EP | 1847454 A3 * | 5/2010 | |
| GB | 2203090 | | 1/1990 | |
| WO | WO 2006125127 A2 * | 11/2006 | |
| WO | 2008050206 | | 5/2008 | |
| WO | WO 2008050206 A2 * | 5/2008 | B63G 8/38 |
| WO | WO 2013004628 A1 * | 1/2013 | |

\* cited by examiner

LIFTING APPARATUS FOR SUBMARINE-ATMOSPHERIC INTERFACE DEVICES AND SUBMARINE COMPRISING THE LIFTING APPARATUS

This application claims priority to Italian Patent Application BO2012A000200 filed Apr. 13, 2012, the entirety of which is incorporated by reference herein.

BACKGROUND OF THE INVENTION

This invention relates to a lifting apparatus for atmospheric interface devices on a submarine (or submersible), and a submarine (or submersible) comprising the lifting apparatus.

The invention applies generally to the naval (or nautical) sector and, more specifically, to the production of military submarines.

Indeed, during navigation underwater, submarines often need to lift above the surface of the water several atmospheric interface devices, be they for detection (sensors), communication (antennas), observation (periscope) or alternatively air intake (snorkel) to exchange information with the outside or to recharge the batteries In this text, the term "atmospheric interface" is used to include all the devices just mentioned as well as other similar devices normally used in submarines.

Lifting is normally effected by specific movable mounting units, consisting mostly of lengthwise, faired tubular structures or masts, to which the sensors or antennas devices, driven by specific actuators, are anchored Traditionally, each sensor (or antenna) is driven by a dedicated lifting apparatus, or by one which is at most shared with another sensor.

Typically, this system consists of a guide, having a closed polygonal cross section, inside which the movable mounting unit slides.

Depending on the type of lifting system, which may be single- double-stage, the movable mounting unit has a different structure and a variable number of components.

In the case of a single-stage lifting system, the movable mounting unit comprises only the faired mast, with the sensor/antenna installed on the top of it.

Alternatively, in the case of a double-stage lifting system, the faired mast (first stage) comprises inside it a slider (second stage) on which the sensor/antenna is installed That way, the lifting stroke is divided into two half-strokes, one travelled by the mast and one by the slider.

As mentioned above, solutions are also known where two or more sensors/antennas are installed on a single lifting apparatus.

In these solutions, too, however, there is a single faired mast (or first stage) driven by a dedicated actuator to lift both of the sensors.

A double-stage lifting system is also known where the drive of the two (or more) sensors is partly independent, the first stage faired mast) being shared and the second stage, which requires much less powerful and smaller actuators, being independent.

The integration of two or more sensors/antennas using a single first stage, shared by the two or more sensors/antennas is, however, strongly limited by the need to keep their dimensions within relatively restricted limits in order for them to be effectively integrated (without departing from design parameters).

A lifting apparatus of the type described above is described in document EP2076428 in the name of the same Applicant as this invention.

In light of this, no solutions are currently known which allow a plurality of devices (sensors/antennas) of reduced size to be lifted independently.

SUMMARY OF THE INVENTION

The aim of this invention is to provide a lifting apparatus and a submarine that overcome the above mentioned disadvantages of the prior art.

More specifically, this invention has for an aim to provide a lifting apparatus for the interface devices of a submarine and a submarine equipped with such a device which is at once highly versatile and reduced in size.

Another aim of the invention is to provide a lifting apparatus for the interface devices of a submarine which is simple to make and easy to install.

These aims are fully achieved by the lifting apparatus for the interface devices of a submarine and the submarine according to the invention, comprising the features described in one or more of the claims.

BRIEF DESCRIPTION OF THE DRAWINGS

The features of the invention will become more apparent from the following detailed description of a preferred, non-limiting example embodiment of it, with reference to the accompanying drawings, in which.

DESCRIPTION OF THE PREFERRED EMBODIMENTS

With reference to the accompanying drawings, the numeral 1 denotes a lifting apparatus for atmospheric interface devices 3, according to this invention.

The lifting apparatus 1 is installed in a submarine 100 to allow the submarine itself to carry the devices 3, such as sensors or antennas, above the water surface during navigation at periscope depth.

The submarine 100 is a watercraft capable of surface navigation and which, when necessary, can submerge for more or less extended periods of time to continue navigating underwater.

In this invention, the term "submarine" is used to mean any submersible watercraft, including naval vessels designed mainly for independent operation below the surface of the water and also able to navigate partly above surface.

In other words these naval vessels developed out of traditional "submersible" watercraft and thus fall within the scope of the invention.

The submarine 100 comprises a hull 101 extending lengthways along a respective direction of extension "A" and designed to operate underwater, below the surface "P" of the water.

The hull 101 is elongate in shape and preferably has a streamlined front portion 101a to improve water penetration during navigation.

The hull 101 is thus powered to navigate along a respective direction of travel both underwater and (partly) above the surface of the water.

Typically, the hull 101 is divided into two hulls (not illustrated in detail) located one inside the other and between which are defined ballast tanks which are designed to be filled or emptied (through suitable valves) to allow navigation underwater (tanks full) and at the surface (tanks empty).

The hull 101 also comprises an upper portion 101b (or back) with a conning tower 102 (or sail) rising up therefrom.

The conning tower 102 thus defines a protrusion (or projection) extending upwards from the upper portion (or back) of the hull 102 at right angles to its direction The conning tower 102 defines, inside it, a compartment 104 for housing at least one apparatus 1, according to the invention, for lifting a set of atmospheric interface devices 3 designed to measure, communicate and/or recharge the batteries of the submarine.

The compartment 104 preferably houses a plurality of lifting apparatuses 1.

Thus, the conning tower 102 houses one or more of the following interface devices 3:
the snorkel;
the periscopes;
the radio antennas;
the radar antenna;
optical visors;
sensors of diverse kinds.

In other words, the term "interface devices 3" denotes all those devices which must operate, or which preferably operate, above the water's surface, and which are generally connected to the conning tower 102.

Thus, the function of lifting the devices 3 is fulfilled by the lifting apparatus 1, which is installed in the conning tower 102 and which lifts/lowers the devices 3, at least when the submarine 100 is navigating at periscope depth.

The expression "navigation at periscope depth" is commonly used to mean movement of the submarine 100 in a predetermined direction of travel with the hull submerged (i.e. entirely under the surface "P") and the aforementioned devices (including the, periscope, if present) outside the water.

The lifting apparatus 1 comprises at least a first movable mounting unit 4 and a second movable mounting unit 5, each of which is equipped at the top of it 4a, 5a with one or more of the aforementioned interface devices 3.

In a first embodiment, with a single lifting stage, the movable mounting unit 4, 5 comprises an elongate body 6 extending along a respective main axis "B".

Preferably, the elongate body 6 has the form of a faired mast 6a, that is to say, it has a cross section (transversal to the main axis "B") which is principally elliptic/circular in shape.

Installed at the top of the elongate body 6 there is at least one device 3.

In a second embodiment, with a double lifting stage, the interior of the elongate body 6 accommodates a slider 7, which slides relative to the elongate body 6 itself (which thus acts as a guide), and a drive motor (not illustrated) associated with the slider 7 for the lifting and lowering thereof.

In this embodiment, the device 3 (or the devices 3) are anchored to the top of the slider 7 in such a way as to slide as one with it along the elongate body 6 to complete the lifting movement.

Thus, the devices 3 are lifted in two successive steps (or, if necessary, simultaneous steps), a first step in which the elongate body 6 and the slider 7 with it are extracted from the conning tower 102 of the submarine 100, and a second step in which the slider 7 is moved relative to the elongate body 6 by the drive motor in order to complete the lifting movement.

The lifting stroke is thus divided into two half-strokes, performed respectively by the elongate body 6 (that is, the faired mast 6a) and by the slider 7.

To allow lifting of the first movable mounting unit 4 and of the second movable mounting unit 5 (or at least of the elongate body 6), the lifting apparatus 1 comprises actuating means 9 associated with the first movable mounting unit 4 and with the second movable mounting unit 5 in such a way as to drive them along the main movement (or lifting) direction "B".

Preferably, the actuating means 9 comprise a first actuator 9a and a second actuator 9b associated with the first movable mounting unit 4 and with the second movable mounting unit 5, respectively, in order to keep the movements independent of each other.

These actuators may be hydraulic, pneumatic or electrical (rotary or, as explained in more detail below, linear).

For example, the actuator may be hydraulic, pneumatic or electrical. In all these cases, the second stage or second half of the telescopic stroke may be accomplished by a cable drive system.

In operation, the main direction "B" is obviously a substantially vertical direction, at right angles to the direction of extension "A" of the hull 101.

The lifting apparatus 1 also comprises a supporting member 10 extending along the aforementioned main direction "B" and interposed between the first movable mounting unit 4 and the second 5.

Thus, the first movable mounting unit 4 and the second 5 are both anchored (connected) to the supporting member 10 interposed between them.

The supporting member 10 extends along the main direction "B" between a first end 10a, preferably anchored to a foundation 102a of the conning tower 102, and a second end 10b, preferably anchored to a cover 102a of the conning tower 102.

The supporting member 10 also has a pair of guides 11, 12, each extending along the main direction "B" and slidably coupled to a respective movable mounting unit 4, 5 to guide its movement along the main direction "B" itself In other words, the supporting member 10 comprises a first guide 11, with which the first movable mounting unit 4 is slidably associated, and a second guide 12, with which the second movable mounting unit 5 is slidably associated.

In other words, the two guides 11, 12 associated with the single supporting member 10 define a single guide member 2 interposed between the two movable mounting units 4, 5.

Advantageously, that means both the overall dimensions and the weight of he lifting apparatus 1 can be considerably reduced.

It should be noted that each elongate body 6 comprises a shoe or runner 6b which is slidably engaged with the respective guide 11, 12.

Preferably, the shoe or runner 6b is located at a peripheral (or perimeter) portion of the elongate body 6 (and thus of the faired mast) facing the respective guide 11, 12

In a first embodiment, the two guides 11, 12 are made of the same material as the other surfaces of the supporting member 10.

Alternatively, the guides 11, 12 are made by overlaying a sheet not illustrated) of material having wear and friction properties suitable for allowing the shoes or runners 6b to slide repeatedly over them For example, the guides 11, 12 and the shoes of the movable mounting units 4, 5 may be made of steel or of a composite material. If a composite material is used, the slideways must have steel sheets applied to them in order to limit wear thanks to suitable friction coefficients.

The guides 11, 12 preferably comprise retaining means 11a, 12a to restrict each mounting unit 4, 5 (and more specifically, the shoe or runner 6a) to sliding movement only In other words, the guides 11, 12 are shaped in such a way as to prevent the guides 11, 12 themselves from becoming detached from the shoe 6b or runner of the elongate body 6

The expression "becoming detached" is used to mean coming apart along a direction (horizontal) at right angles to the main direction "B".

Preferably, the supporting member comprises a central core 13a, designed to guarantee the stability of the mounting units and thus of a size such as to ensure suitable stiffness and strength, and at least two peripheral portions 13b, 13c defining the guides 11, 12.

More specifically, each peripheral portion 13b, 13c is defined by a pair of undercuts which face each other and to which the respective movable mounting unit 4, 5, in particular, the shoe or runner 6b is slidably constrained These undercuts therefore define both the guides 11, 12 and the retaining means 11a, 12a.

The shoe or runner 6b of the movable mounting unit 4, 5 is thus at least partly shaped to match the undercuts so as to be constrained to run in the guide 11, 12

Thus, each undercut can be likened to a track of the guide 11, 12.

Preferably, the guides 11, 12 are formed on opposite sides of the transversal section of the supporting member 10 and face away from each other.

More specifically, the guides 11, 12 face the outside of the supporting member 10, away from each other, that is to say, they face opposite sides of the supporting member 10 and are accessible from the outside.

Figure 1:
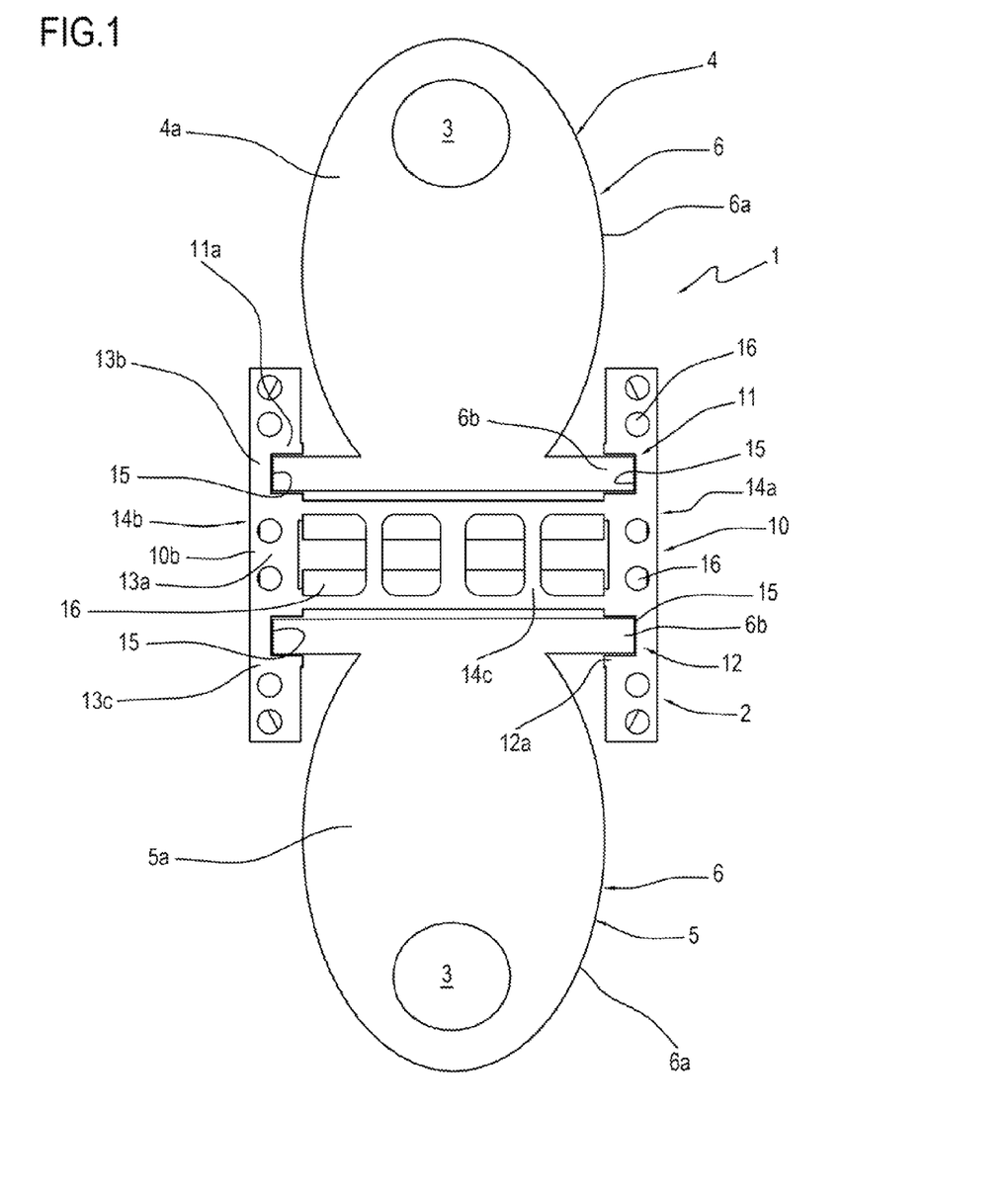
FIG. 1 is a schematic plan view of a lifting apparatus according to this invention.
Figure 2:
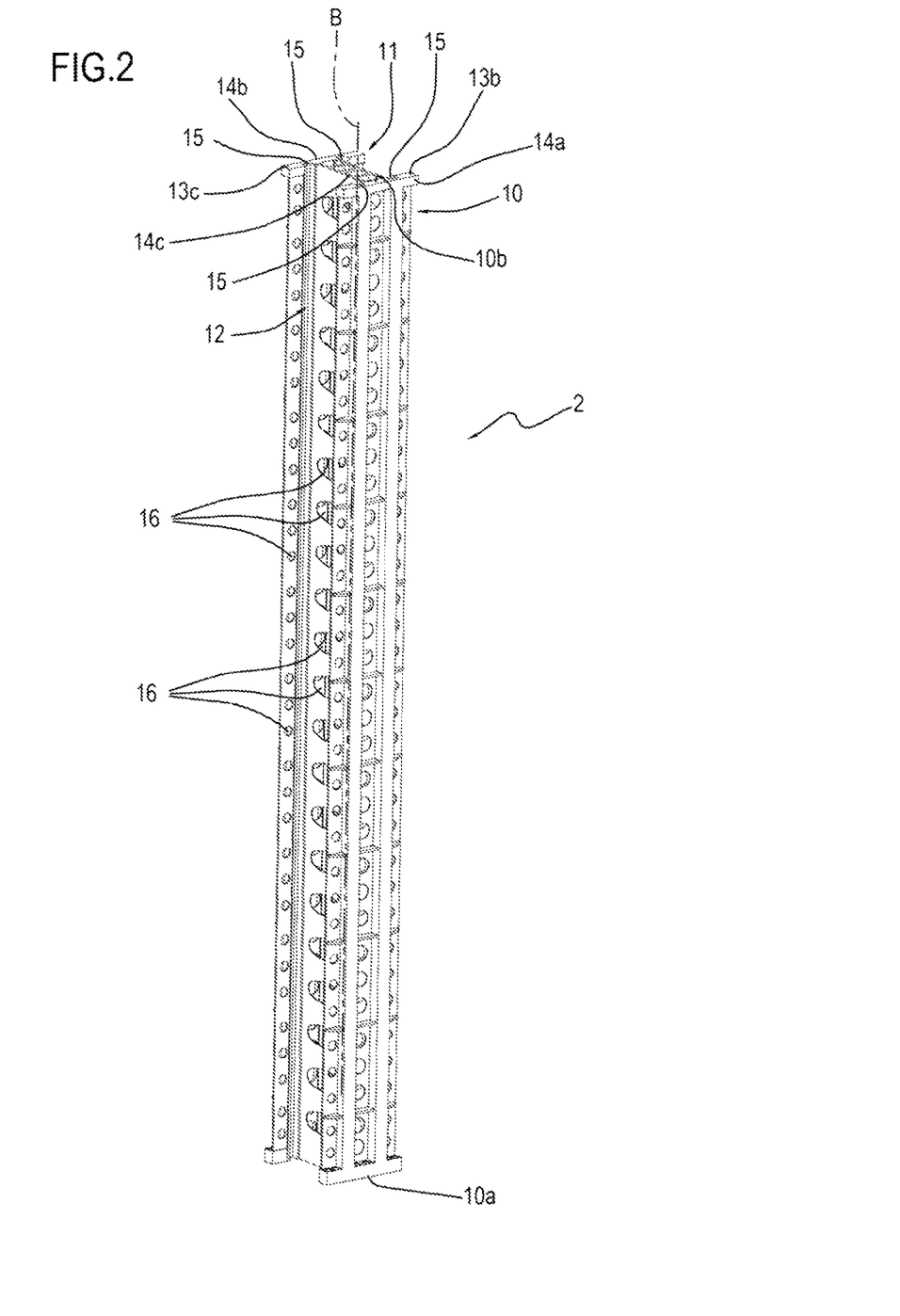
FIG. 2 is a perspective view of a supporting member of the lifting apparatus of FIG. 1.
Figure 3A:
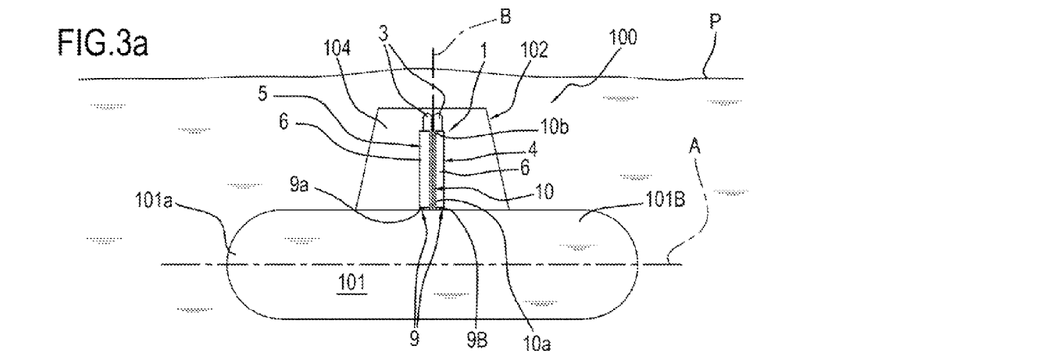
FIGS. 3a-3c show the lifting apparatus of FIG. 1 in different operating configurations, both single-stage (3b) and double-stage (3c)
Figure 3B:
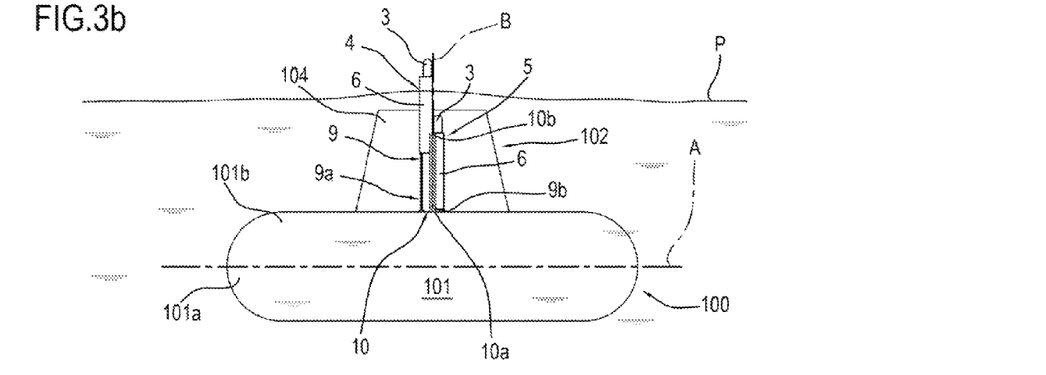
Figure 3C:
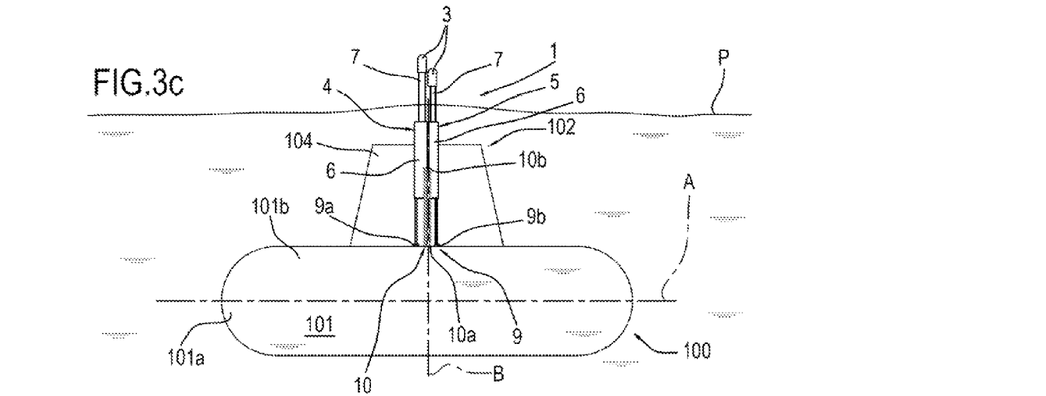

In the embodiment illustrated in FIGS. 1-3c, the supporting member 10 is an oblong beam comprising a pair of walls 14a, 14b which face each other and are spaced apart, which extend principally along the main direction "B and which are connected to each other by a central partition 14c transversal to them In other words, the supporting member 10 has a substantially H-shaped transversal cross section.

it should be noted that both the walls 14a, 14b and the partition 14c are provided with through openings and apertures 16 designed to lighten the structure of the supporting member 10 without limiting its strength.

Each of the walls 14a, 14b is provided with a pair of lengthwise grooves 15 located on opposite sides of the wall 14a, 14b with respect to the central partition 14c.

Each groove 15 faces (and is aligned with) the corresponding groove 15 of the other wall to at least partly define one of the guides 11, 12.

The grooves 15 thus define the above mentioned undercuts (as well as the retaining means 11a, 12a).

In short, the supporting member defines a straight profile with an open polygonal section.

The expression "open polygonal section" defines the open shape of the transversal cross section whereby the two guides are accessible from the outside.

In effect, the H shape is a typical example of an open polygonal section. Alternatively, other shapes are imaginable, provided they are accessible from both sides, like the one illustrated.

Figure 8A:
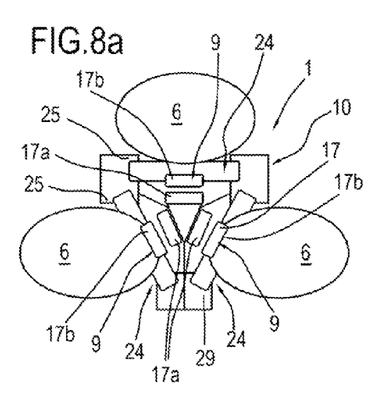
Figure 8B:
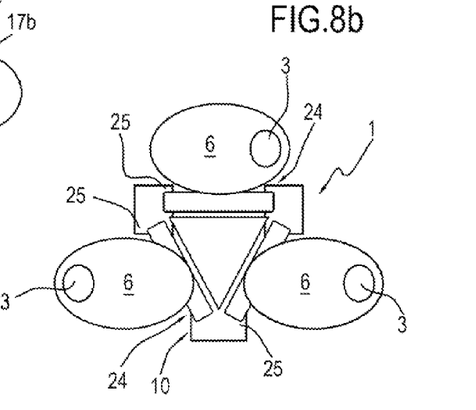

In an alternative embodiment (FIGS. 8a, 8b), the supporting member 10 has a triangular section, with three faces 24, each of which has a guide 25 made in it, preferably provided with opposite, facing grooves like the one described above.

Figure 7A:
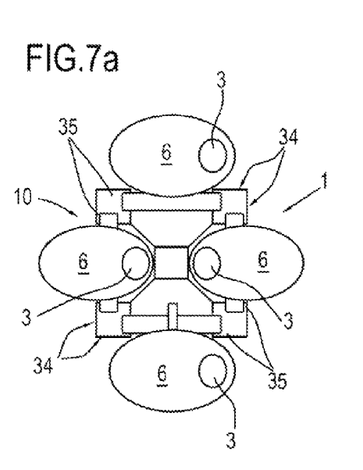
FIGS. 7a, 7b, 8a and 8b show schematic plan views of alternative embodiments of the lifting apparatus according to the invention.
Figure 7B:
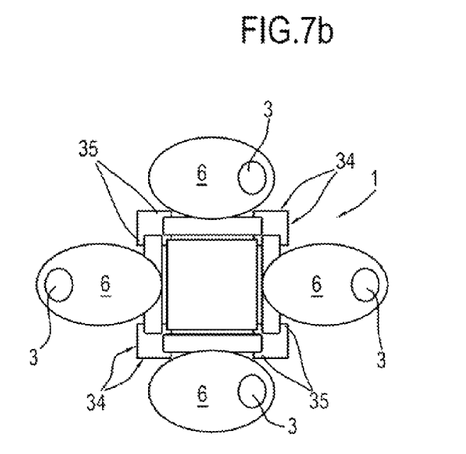

Alternatively (FIGS. 7a, 7b), the supporting member 10 may have a quadrilateral section, with four faces 34, each of which has a guide 35 made in it, also similar to the ones described above.

In a preferred embodiment (illustrated in FIG. 5), each actuator 9a, 9b comprises a linear electric motor 17 equipped with a stator portion 17a associated with a respective guide 11, 12 of the supporting member 10 and a movable portion 17b associated with the respective movable mounting unit 4, 5.

Advantageously, the actuator of the first lifting stage can operate rapidly and is reduced in size.

Figure 5:
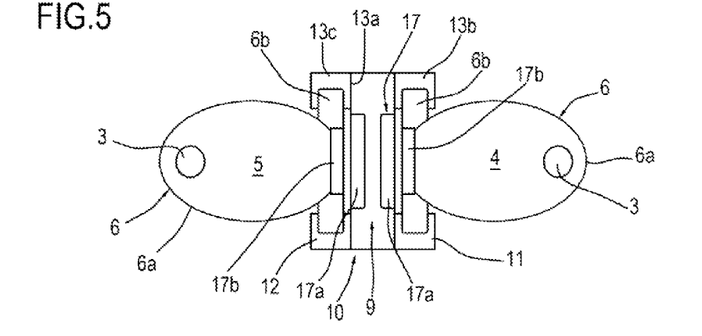
FIG. 5 shows a schematic plan view of the apparatus of FIG. 1 in an alternative embodiment.

Moreover, an actuator of this kind allows rapid positional control of he elongate body 6 (faired mast) relative to navigation depth.

In an alternative embodiment (FIGS. 4, 6), the conning tower 102 comprises at least one crosswise or lengthwise panel 103 having a first face 103a and a second face 103b opposite each other.

Figure 4:
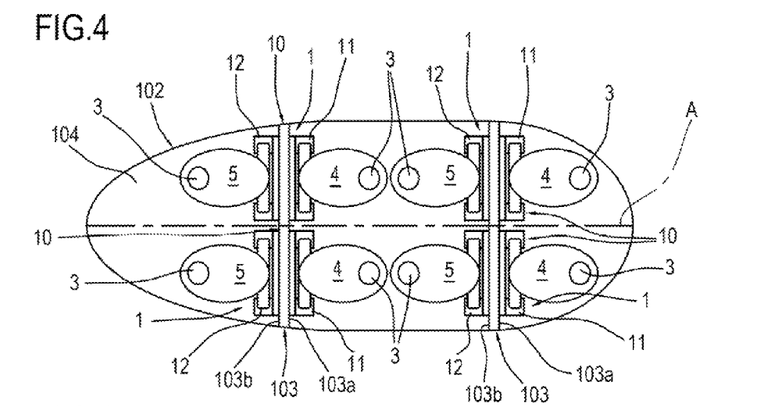
FIGS. 4 and 6 show two alternative embodiments of the lifting apparatus according to the invention, with the supporting member integrated in the conning tower.
Figure 6:
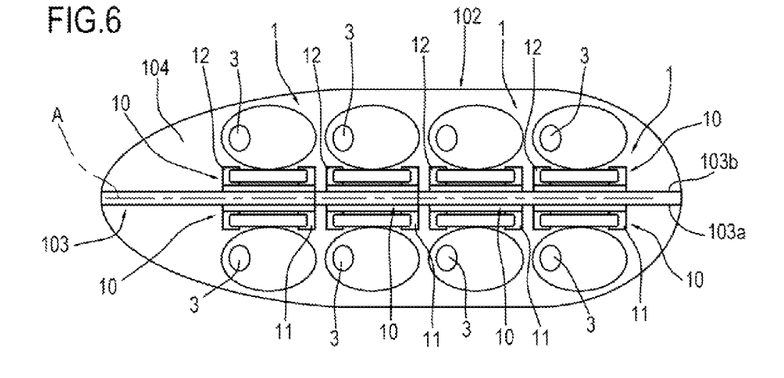

More specifically, the conning tower 102 may comprise, alternatively or in combination, a plurality of crosswise panels, transversal to the direction of extension "A" of the hull 101, or a lengthwise panel, parallel to the direction of extension "A" of the hull 101.

In this embodiment, the panel 103 at least partly defines the supporting member 10.

Thus, the guides 11, 12 are associated with the first face 103a and with the second face 103b, respectively.

In other words, the panel 103 defines the central supporting core to which only the guides 11, 12 are anchored.

The invention achieves the preset aims and brings important advantages.

Indeed, the presence of a single guide element interposed between the movable mounting units makes it possible to integrate two or more drive systems (lifting/lowering) for sensors and/or antennas, saving space and weight inside the conning tower and maintaining independent operation.

The space saved makes it possible to reduce the weight and horizontal dimensions of the lifting apparatus.

Moreover, integrating the supporting member and the guides in the crosswise or lengthwise panels of the conning tower eliminates the need for cumbersome single-dedicated guide systems by using structural elements already present in the compartment.

What is claimed is:

1. A lifting apparatus for atmospheric interface devices in a submarine, comprising:
a first movable mounting unit equipped at a top thereof with a first atmospheric interface device;
a second movable mounting unit equipped at a top thereof with a second atmospheric interface device;
a main actuator associated with the first movable mounting unit and with the second movable mounting unit to move the first and second movable mounting units along a main direction of movement;
a supporting member extending along the main direction and interposed between the first movable mounting unit and the second movable mounting unit; the supporting member having a pair of guides, each extending along the main direction and slidably coupled to a respective one of the one of the first and second movable mounting units to guide the movement of the respective one of the one of the first and second movable mounting units along the main direction;

wherein the supporting member defines a rectilinear profile with an open polygonal section.

2. The lifting apparatus according to claim 1, wherein the main actuator comprises a first actuator and a second actuator associated with the first movable mounting unit and with the second movable mounting unit, respectively, to move the first movable mounting unit and with the second movable mounting unit independently along the main direction.

3. The lifting apparatus according to claim 1, wherein the pair of guides are formed on opposite sides of the transversal section of the supporting member and face away from the transversal section of the supporting member.

4. The lifting apparatus according to claim 1, wherein each guide is defined by a pair of undercuts which face each other and to which the respective movable mounting unit is slidably constrained.

5. The lifting apparatus according to claim 1, wherein the supporting member comprises a pair of wags facing each other and spaced apart, extending principally along the main direction and connected to each other by a central partition transversal to the pair of walls; both of the walls being provided with a pair of lengthwise grooves located on opposite sides of each wall with respect to the central partition and each facing the corresponding groove of the other wall to at least partly define the guides.

6. The lifting apparatus according to claim 4, wherein each movable mounting unit comprises a shoe or runner at least partly shaped to match the grooves or the undercuts so as to be constrained to run in the guide.

7. The lifting apparatus according to claim 6, wherein each movable mounting unit comprises an elongate body; the shoe or runner being located at the peripheral portion of the elongate body facing the respective guide.

8. The lifting apparatus according to claim 1, wherein each of the first and second actuators comprises a linear electric motor equipped with a stator portion combined with a respective guide of the supporting member and a movable portion slidably arranged with respect to the stator portion and combined with the respective movable mounting unit.

9. A submarine comprising:
a hull extending longitudinally along a respective axis of extension and designed to operate underwater, below the surface of the water;
a conning tower rising up from the top of the hull and defining a compartment for housing at least one lifting apparatus for atmospheric interface devices; the apparatus comprising:
a first movable mounting unit and a second movable mounting unit each equipped at a top thereof with an interface device;
an actuator to move the first and second movable mounting units along a main direction of movement;
a supporting member extending along the main direction and interposed between the first movable mounting unit and the second movable mounting unit; the supporting member having a pair of guides, each extending along the main direction and slidably coupled to a respective one of the first and second movable mounting unit to guide the movement of the respective one of the one of the first and second movable mounting units along the main direction;

wherein the supporting member defines a rectilinear profile with an open polygonal section.

10. The submarine according to claim 9, wherein the conning tower comprises at least one crosswise or lengthwise panel having a first face and a second face opposite each other; the panel at least partly defining the supporting member and the guides being combined with the first face and with the second face, respectively.

11. A lifting apparatus for atmospheric interface devices in a submarine, comprising:
a first movable mounting unit equipped at a top thereof with a first atmospheric interface device;
a second movable mounting unit equipped at a top thereof with a second atmospheric interface device;
a main actuator associated with the first movable mounting unit and with the second movable mounting unit to move the first and second movable mounting units along a main direction of movement;
a supporting member extending along the main direction and interposed between the first movable mounting unit and the second movable mounting unit; the supporting member having a pair of guides, each extending along the main direction and slidably coupled to a respective one of the one of the first and second movable mounting units to guide the movement of the respective one of the one of the first and second movable mounting units along the main direction;
wherein the supporting member comprises a pair of walls facing each other and spaced apart, extending principally along the main direction and connected to each other by a central partition transversal to the pair of walls; both of the walls being provided with a pair of lengthwise grooves located on opposite sides of each wail with respect to the central partition and each facing the corresponding groove of the other wall to at least partly define the guides.

12. The lifting apparatus according to claim 11, wherein each movable mounting unit comprises a shoe or runner at least partly shaped to match the grooves or the undercuts so as to be constrained to run in the guide.

13. The lifting apparatus according to claim 12, wherein each movable mounting unit comprises an elongate body; the shoe or runner being located at the peripheral portion of the elongate body facing the respective guide.

14. The lifting apparatus according to claim 13, wherein each of the first and second actuators comprises a linear electric motor equipped with a stator portion combined with a respective guide of the supporting member and a movable portion slidably arranged with respect to the stator portion and combined with the respective movable mounting unit.

15. The lifting apparatus according to claim 11, wherein each of the first and second actuators comprises a linear electric motor equipped with a stator portion combined with a respective guide of the supporting member and a movable portion slidably arranged with respect to the stator portion and combined with the respective movable mounting unit.

* * * * *